United States Patent

Brassard

[11] Patent Number: 5,861,695
[45] Date of Patent: Jan. 19, 1999

[54] COMPOSITE INDUCTOR FOR ELECTRIC ROTARY MACHINES COMPRISING SINTERED PERMANENT MAGNETS COATED WITH A FERROMAGNETIC BINDER

[75] Inventor: Serge Brassard, Pontcharra, France

[73] Assignee: Ugimag SA, St. Pierre d'Allevard, France

[21] Appl. No.: 875,109

[22] PCT Filed: Feb. 13, 1996

[86] PCT No.: PCT/FR96/00231

§ 371 Date: Jul. 24, 1997

§ 102(e) Date: Jul. 24, 1997

[87] PCT Pub. No.: WO96/25785

PCT Pub. Date: Aug. 22, 1996

[30] Foreign Application Priority Data

Feb. 16, 1995 [FR] France ................................. 95 02009

[51] Int. Cl.⁶ .................................. H02K 1/17; H02K 1/27
[52] U.S. Cl. ........................ 310/154; 310/45; 310/43; 310/254

[58] Field of Search ................................. 310/43, 44, 45, 310/154, 155, 152, 254

[56] References Cited

U.S. PATENT DOCUMENTS 3,899,702  8/1975  Hanna et al. .............................. 310/154

FOREIGN PATENT DOCUMENTS 2617344  12/1988  France .............................. H02K 1/18

*Primary Examiner*—Thomas M. Dougherty
*Assistant Examiner*—B. Mullins
*Attorney, Agent, or Firm*—Dennison, Meserole, Pollack & Scheiner

[57] ABSTRACT

An inductor for an electrical rotary machine having a hollow or solid cylindrical yoke with a side wall to which is attached at least one sintered magnet having a pole face disposed facing an armature. The magnet is attached to the yoke by an over-molding which coats at least the pole face with a composite over-molding material containing a ferromagnetic material dispersed in a solid non-magnetic binder.

15 Claims, 3 Drawing Sheets

COMPOSITE INDUCTOR FOR ELECTRIC ROTARY MACHINES COMPRISING SINTERED PERMANENT MAGNETS COATED WITH A FERROMAGNETIC BINDER

FIELD OF THE INVENTION

The invention relates to an inductor for an electric rotary machine comprising sintered permanent magnets embedded in a ferromagnetic binder.

Electric rotary machines are chiefly electric motors or electric generators, for example for automobile auxiliary equipment; they comprise an inductor which is generally the stator but sometimes the rotor.

DESCRIPTION OF RELATED ART

Usually an inductor comprises a yoke, a cylindrical tubular piece whose cross-section has at least one axis of symmetry and a shape which is generally circular, polygonal or square with rounded corners.

One or more permanent magnets made of hard magnetic material are attached to the inner wall of the yoke, which is made of soft magnetic material. They can be of annular shape, a single magnetized piece covering the inner periphery of the cross-section, or in the form of several magnetized parts symmetrically distributed on this periphery; these pieces can have a cross-section that is for example rectangular, or preferably can be a section of a circular ring, or can have at least one surface of circular cross-section adapted to the armature.

These permanent magnets can be sintered pieces, or bound composite magnets, the magnetized material for example being embedded in a solid resin. They are such that they leave a space at the center of the yoke in which the armature of the rotary machine is located.

Pole pieces be added to the permanent magnets on the armature side in order to modify the magnetic flux and improve the performance of the rotary machine.

The active material of the permanent magnets is of a known type, for example ferrite, an alloy containing rare earths (such as Nd—Fe—B or Sm—Co) or other materials. Like the yoke, the pole pieces are made of soft magnetic material, for example steel.

Between the magnets or the pole pieces and the armature is the air gap, the thickness of which must be as limited and as uniform as possible. In mass produced motors it is usually on the order of 0.6 to 1 mm. It is difficult to have a smaller thickness, particularly due to the fact that the yoke, which the magnets, possibly with their pole pieces, lean against, is generally made of rolled or drawn steel and has a geometric irregularity, due to dimensional and symmetrical tolerances, which is cumulative with that of the other components.

In order to produce this result, it is necessary to subject the magnet to a careful and costly machining. This machining requires great care, particularly when the magnet is made of sintered material.

However, it is sometimes possible to produce air gaps with a thickness reduced to 0.3 mm by taking precautions in both the machining and the assembly of the various components of the inductor, precautions which are often difficult to carry out and lead to a substantial increase in cost.

The magnets are usually attached inside the yoke by means of removable clamps or pins, by being held in a non-magnetic casing (for example, made of plastic), by welding or by injection of a non-magnetic resin.

It is also known, and advantageous for achieving the mounting of the magnets, to embody a rigid piece comprising machined magnets (possibly with their pole pieces) over-molded with a non-magnetic material, for example aluminum or a thermosetting resin. The rigid assembly is then easily introduced and positioned in the yoke; it can also be obtained by over-molding the magnets directly in the yoke.

In any case, the magnets are in contact with the yoke, or with equivalent pieces, made of soft ferromagnetic material, so as to ensure a continuous circuit of magnetic flux between the magnets, which is essential to the operation of the motor.

One solution of this type is known from the patent FR 2617344. Composite magnets (4), possibly associated with additional pole pieces, wherein the profile of the pole face is adapted and concentric to the armature, produced from a Nd—Fe—B powder mixed with a binder or compacted, are in contact with the yoke (1) and are possibly associated with additional pole pieces; they are molded in this yoke (1) with a resin which ensures their attachment by means of the lateral parts (7); moreover, the magnet is protected from a potentially corrosive atmosphere by a coat of resin (5) with a constant thickness of about 5 mm on its pole face facing the armature.

Thus, in the embodiment described, the thickness of the magnet/armature gap will be greater than the usual values of 0.6 to 1 mm given above since it will be necessary to add to it the thickness of the non-magnetic substance (5) covering the pole face of the magnet; the performance of the rotary machine will be affected accordingly, even if the distance separating the molded non-magnetic substance (5) from the armature is very slight (for example 0.3 mm).

Also known from the patent JP-A-60 131055 is a bound magnet (4), that is, one which is based on a hard magnetic material dispersed in a thermoplastic binder, molded onto the entire inner periphery of the yoke, which magnet also includes auxiliary poles (3). Here again, the profile of the pole face of the magnet is adapted and concentric to the yoke and to the armature, and the air gap of constant thickness is determined solely by the distance between the magnet and the armature. Moreover, even if the thickness of the air gap can be slight thanks to the use of a magnet molded to the yoke, the performance of the motor will be diminished because of the use of this molded magnet.

Also known from the patent FR 2 617 343 is an inductor comprising magnets identical to those of the above-mentioned patent FR 2 617 344, that is, bound magnets whose pole face has a shape corresponding to that of the armature; these magnets, possibly associated with additional pole pieces, are attached to the yoke and protected from corrosion by a (sheet) metal sheath fitted to the entire contour of the magnetic poles formed by the assemblies of magnets and pole pieces. As before, the magnet has a shape adapted to the armature, the distance between the magnet (or magnetic pole) and the armature being constant.

In an assembly of this type, there must be concentricity between the inductor and the yoke so as to have the smallest magnet-armature air gap possible, which requires careful assembly and machining of the various components. In spite of this, one skilled in the art cannot expect to obtain an air gap thickness of less than 0.6 mm, as seen above.

Also known from the patent FR 2 169 938 is an inductor comprising flat magnets (110) in contact with flux path pieces (116), held in place by means of an over-molded plastic casing (16). This casing constitutes an additional non-magnetic gap between the magnets and the armature: it has a surface that is concentric to the armature and has a variable thickness to compensate for the fact that the pole face of the magnets is not adapted and concentric to the armature. An inductor of this type, due to this magnet shape, has characteristics inferior to those of an inductor having magnets that are adapted and concentric to the armature. In particular, for the same power, a motor having this type of flat magnet will require a greater magnet mass, and for this reason will be much more voluminous and expensive.

It is therefore apparent that the motors having the best performance levels are obtained with inductors comprising magnets that are precisely machined or molded and thus adapted and concentric to the armature so as to reduce the air gap thickness and the magnetic loss as much as possible.

The motors having the best performance levels are also those which use sintered magnets rather than bound magnets, even if the latter are molded concentrically to the armature. In effect, a bound magnet will always have magnetic properties inferior to those of sintered magnets because of its crystallographic isotropy. The fact that these bound magnets are attached to the yoke by means of over-molding with a plastic polymer does not make it possible to compensate for the difference.

It can also be noted, based on the above, that the magnets or the magnetic poles are always in contact with the yoke or with flux path pieces and that in order to obtain motors having acceptable performance levels it is necessary to have the smallest and most uniform air gap thickness possible. For this reason, the yoke must be concentric to the armature as well as the magnets which are attached to it. This results in the need to have very strict tolerances on the yoke, on the machining of the magnets and the additional pole pieces, on the installation of these assemblies and more generally on the inductor-armature assembly, so as to ensure concentricity.

The fact that the magnets are over-molded does not eliminate these necessities, since the over-molding, as already stated, adds additional air gap thickness.

Thus, these motors with magnets that are sintered and machined so as to correspond to the armature and to determine the air gap also have limited characteristics due to the fact that the air gap thickness is always too large, since it must take into account the dimensional tolerances of the yoke and of the assembly in general. Moreover, the machining of the magnets makes these motors costly.

Also, the Applicant sought to produce inductors making it possible to improve the performance levels of motors, and to reduce their cost.

For this reason in particular, the Applicant sought to produce inductors comprising permanent magnets requiring only a partial, less expensive machining, for example a simple roughing, or even no machining at all, or more generally magnets whose shape does not need to be exact, while making it possible at least to retain, but more generally to improve, the characteristics of the rotary machines obtained.

The Applicant also sought to produce inductors which did not necessitate precise requirements or tolerances for the relative positioning of the magnets or magnetic poles and the yoke, or for the concentricity of the yoke with the armature.

The Applicant also sought to exert better control over the dispersion of the lines of flux in the air gap, which makes it possible to improve the individual performance levels of rotary machines and also the homogeneity of the mass production of machines, while retaining a substantial ease of assembly.

The Applicant also sought to obtain small air gaps, for example no greater than 0.3 mm, while retaining the above advantages.

SUMMARY OF THE INVENTION

The invention is an inductor for an electric rotary machine comprising a hollow or solid cylindrical yoke, on one side wall of which is attached at least one magnet having a pole face disposed facing an armature, characterized in that the magnet is attached to the yoke by an over-molding which coats at least this pole face with a composite over-molding material comprising a ferromagnetic material dispersed in a solid non-magnetic binder.

The invention most often relates to an inductor comprising a hollow cylindrical yoke on whose inner wall the magnet or magnets are attached. In this case, the armature is disposed inside the inductor. But it also relates to an inductor comprising a hollow or solid cylindrical yoke or core on whose outer wall the magnet or magnets are attached. In this case, the armature surrounds the inductor.

Thus, the invention relates to an inductor which is either a stator or a rotor and which is disposed either outside or inside the armature.

The invention particularly applies to the mass production of generators or electric motors, particularly for automobile auxiliary equipment, wherein the inductor is generally the stator.

The yoke (or the core) generally has a cross-section with a center of symmetry; it is for example of polygonal shape with rounded corners or preferably circular (for example in the shape of a tube). It is usually made of dense ferromagnetic material, for example steel, so as to connect the lines of magnetic flux.

It is not necessary, however, for the yoke to have precise tolerances; it can therefore have eccentricities or lack of symmetry. Likewise, it does not have to be concentric to the armature. This represents an advantage since it simplifies the method for their obtainment, thus reducing their cost.

According to a preferred configuration of the invention, the inductor comprises a plurality of permanent magnets which constitute as many poles. They usually have a curved shape such that their cross-section is a section of a circular ring whose inner diameter is adapted to that of the armature.

But the invention also makes it possible to use magnets of rectangular or square cross-section to obtain rotary machines having very good performance.

It is not necessary for the magnets to be in contact with the yoke or the flux path pieces. Likewise, it is not necessary for them to be mounted concentrically to the armature.

Thus, the invention makes it possible to combine the use of components having tolerances or requirements that are not very restrictive, therefore not very costly, and relaxed assembly constraints which likewise are not very exacting. It suffices for the surface of the composite over-molding material which faces the armature and determines the air gap thickness to be concentric to the armature, with the best tolerances possible.

The magnets are of a known type. They can be permanent magnets based on ferrite or on rare earths and transition metal (for example Fe—Nd—B or Sm—Co, etc.) and can be in the form of sintered, molded pieces obtained by forming a blank or composite pieces comprising the magnetized hard magnetic material dispersed in a sold non-magnetic matrix, for example a resin. They are usually positioned in proximity to the side wall of the yoke in such a way that their long axis is parallel to that of the yoke.

Their attachment is obtained as a result of the over-molding. The latter can be carried out by injection, extrusion, compaction, molding etc., so as to form a rigid piece which is then placed on the yoke; the over-molding material can also be applied directly inside, and possibly around, the yoke after the magnets have been put in place.

The over-molding material coats each of the magnets at least partially, holding them in place relative to one another and relative to the yoke. The over-molding is such that the magnets are distributed on the peripheral surface of the yoke and such that it delimits the diameter of the inductor. It is this diameter, which is completed by the thickness of the air gap, which determines the diameter of the armature.

The over-molding material covers the pole face of the magnet facing the armature, and since it contains a ferromagnetic material, it establishes and regulates the air gap with this armature. The layer of over-molding material covering the pole face is called the polar layer; it is as thin as possible in order to avoid leaks of transverse magnetic flux; its thickness, which is generally variable, makes it possible to compensate for the irregularities in the shape of the pole face and in the positioning of the magnets which are not concentric or adapted to the armature; on the other hand, the inner surface of the over-molding is adapted and concentric to the armature. The thickness is generally between 0.5 and 5 mm and preferably between 0.5 and 1.5 mm for conventional motors.

A bridge (or return zone) of composite over-molding material can be disposed between two successive magnets, which in particular ensures the rigidity of the inductor assembly, can prevent the need to provide anchor points in the yoke, and makes it possible to desaturate the yoke. It is advantageous, however, to reduce its presence to a strict minimum; its thickness is preferably on the order of 1 to 4 mm so as to prevent magnetic leaks.

The composite over-molding material generally comprises a soft ferromagnetic metal (for example, at least Fe, Co, Ni or their alloys and possibly other known alloying elements) dispersed in a solid non-magnetic material, for example a resin or a thermosetting or thermoplastic binder such as polyamides, polyesters, polyester terephthalates (PET), phenolic resins, epoxy resins, etc.

The magnetic permeability of this composite is always greater than 1 since the magnetic binder contains a ferromagnetic metal; it is generally greater than 2 and preferably between 4 and 40.

The ferromagnetic metal content is preferably between 10 and 40% (by volume).

It must be noted that pole pieces made of soft ferromagnetic metal or non-magnetic inserts, for example for positioning, can also be embedded into the over-molding material as needed.

The permanent magnets, as stated above, can be subjected to a limited or rough machining to eliminate the coarse defects, or no machining at all. In effect, in the invention, the thickness and the regularity of the air gap are not determined by the air gap between a magnet machined with precision and the armature according to the prior art; instead, it is the over-molding or coating material containing the dispersed soft magnetic material and shaped to precise dimensions which ensures the air gap and makes it possible to compensate for the irregularities resulting from a magnet that has not been perfectly machined or positioned or from an imperfect yoke.

The invention is therefore particularly suited to the use of permanent sintered magnets, which are either non-machined or of rudimentary or simple shape, and which are easy and less costly to obtain. In effect, the presence of the ferromagnetic material in the over-molding makes it possible to preserve the very good magnetic properties of the inductors comprising machined sintered magnets without incurring the cost of their machining or of an elaborate shaping process.

The presence of the ferromagnetic material in the over-molding which coats the magnet makes it possible to regulate the magnetic induction in the air gap and thus to minimize the variation of the torque of the machine resulting from sudden variations of the induction in the air gap due to a magnet whose shape is irregular or not adapted to the armature. Moreover, the over-molding allows a complete and rigid immobilization of the magnet, which generates no additional mechanical vibrations. Thus, the noise from magnetic and mechanical sources is considerably reduced.

The fact that the over-molding material can easily be directly shaped to precise dimensions corresponding to the armature makes it possible to obtain substantially reduced air gap thicknesses which are always less than 0.7 mm but can easily be closer to or even less than 0.3 mm. It is often the practice to use this value, which represents a good compromise between a smaller air gap thickness, which allows an increase in the torque of the motor and a larger air gap thickness, which is less sensitive to the geometric and magnetic irregularities of the assembly.

The invention, however, makes it possible, when necessary, to further reduce the air gap thickness without appreciably altering the regularity of operation of the rotary machine and the constancy of its characteristics during mass production.

Another advantage of the invention resides in the fact that it is not necessary to use a yoke which has strict tolerances or is concentric to the armature, to effect an exact positioning of the magnets in contact with the yoke, or to use magnets which accurately reproduce the shape of the armature; in fact, contrary to what is necessary in the prior art, the air gap does not depend on the magnets but on the over-molding material.

When the inductor comprises a plurality of permanent magnets, it is particularly advantageous for the magnetic leaks occurring through the lateral parts of the over-molding material coating the edges (the periphery) of the magnets to be reduced to a minimum in order to limit the loss of magnetic flux in the yoke.

For this purpose, the thickness of this lateral part, which generally does not exceed 1 to 4 mm, can be reduced to a minimum. It can also be eliminated completely, as long as connection points made from the over-molding material are allowed to remain in places, which points contribute to the retention of the magnets and to the connection of the polar layer with the return zone. These lateral parts or the connection points can also be made from non-magnetic over-molding material, thus constituting a composite ferromagnetic and nonmagnetic mounting of the magnets in the yoke.

Other possibilities offered as a result of the advantages provided by the invention include, for example:

at constant dimensions of the motor and at equally constant air gap, reducing the volume of the non-machined magnet so as to obtain a flux substantially equivalent to that of a standard structure of the prior art using machined magnets held in the yoke by means of welding, non-magnetic over-molding or mechanical attachment;

at constant dimensions of the motor, reducing the air gap as well as the volume of the non-machined magnet so as to obtain a flux greater than that of the above-mentioned structure, thus improving the performance of the rotary machine;

at constant magnet volume and possibly at a reduced air gap, considerably increasing the flux relative to the above-mentioned standard structure, thus improving the performance of the rotary machine;

at constant dimensions and possibly at a reduced air gap, increasing the volume of the non-machined magnet, thus increasing the angle of coverage of a pole. Before the invention, especially in the case of anisotropic sintered magnets having a curved shape, manufacturing constraints did not permit continuous and economic production of magnets having a wide angle of coverage. Thus, as a result of the over-molding of the invention, a pole can be produced by connecting end-to-end several magnets which are magnetized in the same direction; this makes it possible to easily obtain very wide angles of coverage, which for example easily exceed 140° to 160°.

In effect, the presence of the ferromagnetic over-molding material, particularly between the contiguous magnets with the same polarity which form the pole, makes it possible, despite the magnetic fractionation of the pole, to ensure good homogeneity of the magnetic induction under the pole. This way of increasing the magnet volume is economical and produces gains in flux and in performance which can be very substantial:

constituting, according to the preceding method, a circular ring completed by several contiguous magnets held in place by the ferromagnetic over-molding and magnetized so as to obtain any number of magnetic poles;

at least partially covering the other side wall of the yoke which does not include the magnets, making it possible to use yokes produced from a single rolled or drawn sheet so as to obtain a cylinder which is not necessarily closed and which has wider geometric tolerances. In this case, the cylindrical yoke can even be embodied by arcs of attached cylinders, the assembly being over-molded concurrently with the magnets by means of the ferromagnetic binder according to the invention.

DESCRIPTION OF THE PREFERRED EMBODIMENTS

The yoke, made of soft ferromagnetic material, is shown at (1), and permanent magnets made of hard ferromagnetic material, which either are not machined or are roughly machined are shown at (2), with the arrows (3) indicating the direction of the magnetic field. The over-molding material (4) contains a dispersed soft ferromagnetic product, represented by the dots, in a solid non-magnetic matrix, for example a resin. The air gap (5) is delimited by the over-molding material (4) containing the soft ferromagnetic product and the armature (6).

Figure 1:
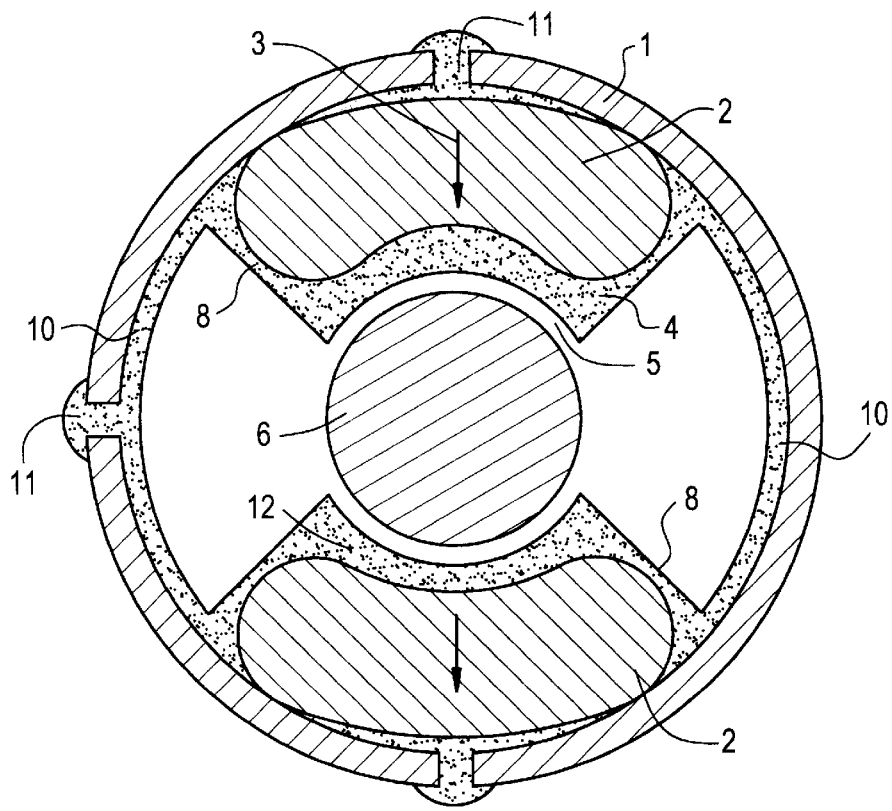
FIG. 1 is a cross-sectional view of a first embodiment of the invention with a hollow cylindrical yoke.
Figure 2:
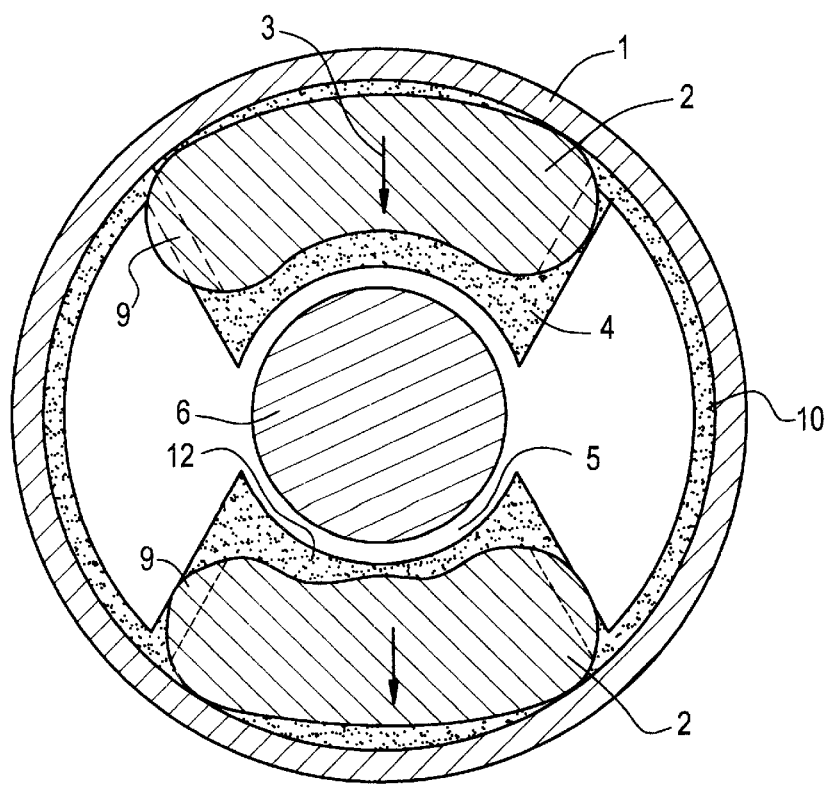
FIG. 2 is a cross-sectional view of a variation of the embodiment shown in FIG. 1.

In FIGS. 1 and 2, the two magnets are separated from one another. In FIG. 1, the over-molding material has been shaped such that the lateral parts (8) coating the edges of these magnets are thin enough to prevent excessive magnetic leaks. In FIG. 2, the lateral parts have been eliminated and replaced by connecting points (9) made of over-molding material which pass through the magnet through holes cut in places and which ensure the cohesion of the over-molding and the magnets. A narrow return zone shown at (10) ensures the rigidity of the assembly of the over-molding material and the magnets.

The over-molding is carried out directly inside the yoke and in this case, as seen in FIG. 1, the over-molding material (4) passes through this yoke in places so as to form anchor points (11). But in the case of FIG. 2, the over-molding is carried out outside the yoke and the rigid assembly of the over-molding material and the magnets is then inserted into the yoke, and ultimately made integral with it by any known means.

The polar layer of composite over-molding material, seen at (12), which makes it possible to compensate for the geometrical irregularities of the permanent magnets, while making it possible to regulate the inner diameter of the inductor in a very precise way, and to thereby correctly control the air gap thickness, particularly in the case of small thicknesses; this results in an improvement of the characteristics of rotary machines while facilitating their construction, including during mass production, and lowers their price due to the absence of a precise machining of the magnets.

Figure 3:
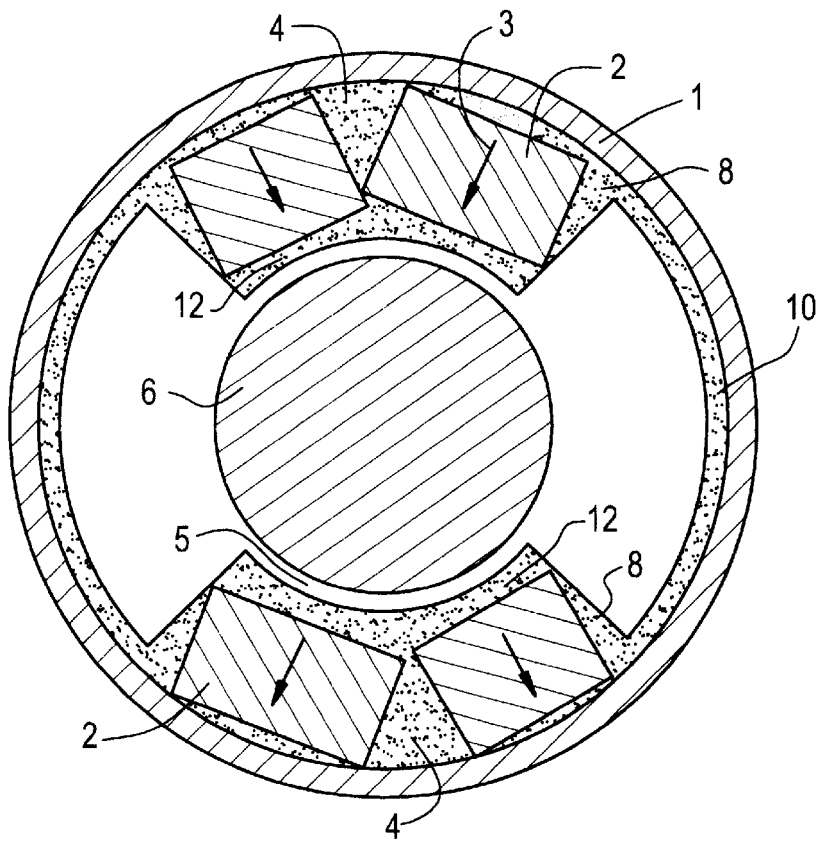
FIG. 3 is a cross-sectional view of another variation of the embodiment shown in FIG. 1.

FIG. 3 represents, in a motor of the same type as those of FIGS. 1 and 2, an inductor according to the invention wherein each of the poles is made of several magnets (2) attached end-to-end, these magnets also having, as a result of the invention, the shape of an elongated parallelepipedic bar.

Figure 4:
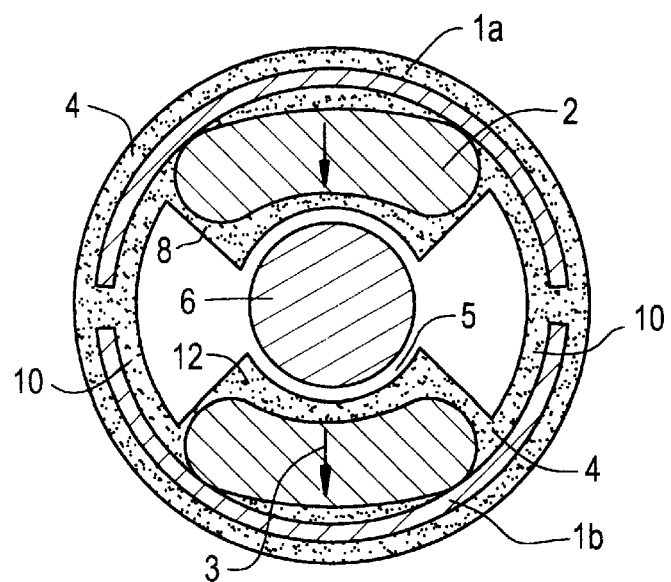
FIG. 4 is a cross-sectional view of a further variation of the embodiment shown in FIG. 1.

FIG. 4 represents a case in which the yoke is in two half-shells (or cylinder arcs) (1*a*) and (1*b*), and in which the over-molding according to the invention encases both the magnets (2) and the two half-shells (1*a*) and (1*b*) so as to obtain a rigid inductor. The junction point between the two half-shells can be located anywhere relative to the axis of the poles.

Figure 5:
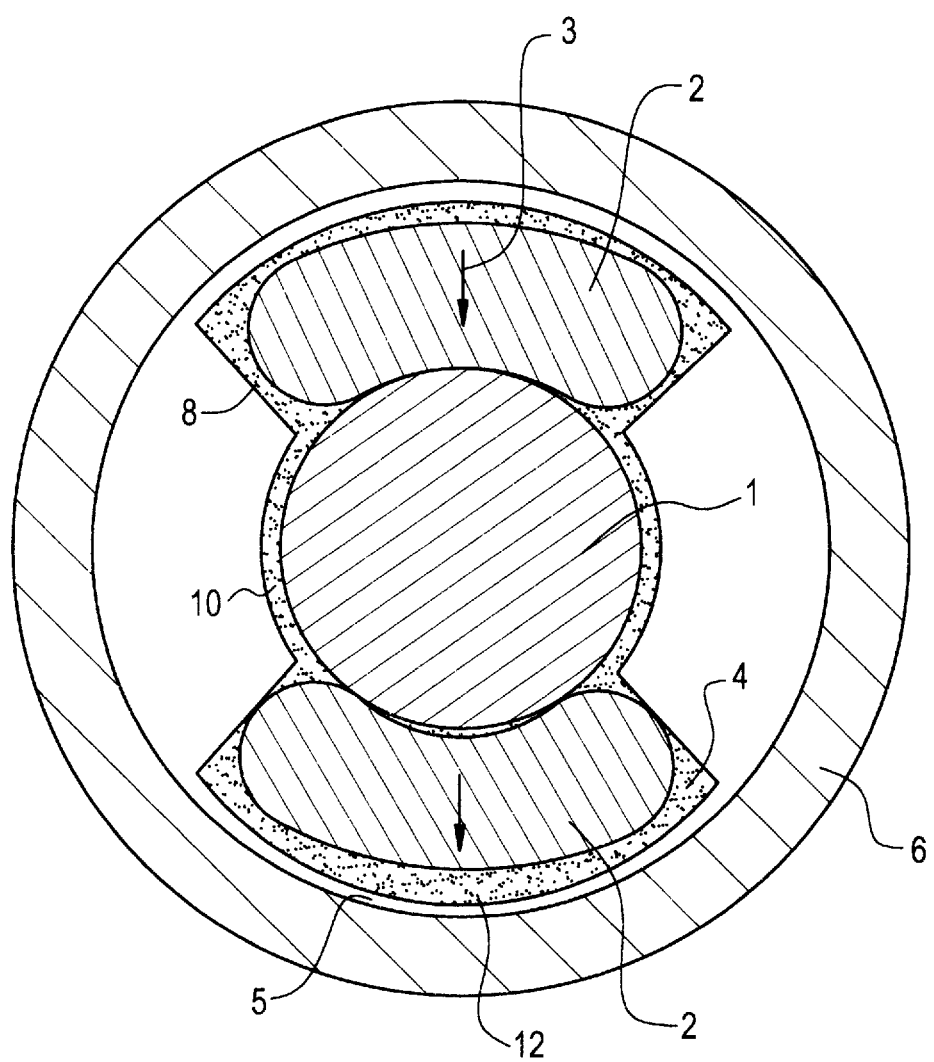
FIG. 5 is a cross-sectional view of a second embodiment of the invention with a solid cylindrical yoke.

FIG. 5 shows an embodiment in which the cylindrical yoke (1) is solid and the armature (6) surrounds the inductor.

EXAMPLES

Example 1

Several automobile interior ventilator motors having constant external dimensions, including two ferrite magnetized poles and a yoke with a diameter of 59 mm, and having an output of 150 W, were compared.

In the standard version, according to the prior art, the magnets were precisely machined from a sintered blank so as to have an air gap with the inductor of about 0.7 mm; they were then put in place and bonded into the yoke by over-molding with a thermosetting resin in such a way that the magnet/armature air gap was in fact 0.7 mm.

The over-molding was such that there was no coat of resin covering the polar surface of the magnet located in the air gap. This makes it possible to avoid increasing the thickness of the gap, which would have been necessary in order to allow for tolerances of eccentricity (yoke, armature) or assembly and would have led to a reduction in the performance of the motor.

In version 1 according to the invention, non-machined blanks of permanent magnets of lower volume were placed inside the yoke and over-molded with a composite material having a magnetic permeability of 4 based on the same thermosetting resin, in which powdered iron (solid content 40% by volume) was dispersed; the air gap between the composite over-molding material and the armature was the same as in the standard version. The thickness of the polar layer was about 1 mm at the thinnest places, and the thickness of the return zone was about 3 mm.

Version 2 was distinguished from version 1 primarily by an air gap on the order of 0.3 mm and by magnets which were thicker, but whose volume remained smaller than that of the standard version.

Table 1 shows the values of the flux, which is directly connected to the performance of the motors, as a function of the geometric parameters of the magnets and the air gap value for the various versions.

TABLE 1

|  | Standard Version (machined magnets) | Version 1 (non-machined magnets) | Version 2 (non-machined magnets) |
| --- | --- | --- | --- |
| Magnet thickness (mm) | 6.05 ± 0.1 | 4.9 ± 0.5 | 5.3 ± 0.5 |
| Magnet volume (%) | 100 | 81 | 88 |
| Air gap (mm) | 0.74 | 0.69 | 0.29 |
| Flux (%) | 100 | 96.3 | 102 |

In comparing the standard version and version 1, it may be seen that at constant external dimensions of the motor, nearly 20% magnet volume is gained, while the performance of the motor is diminished by only 3.7%, a loss which could easily be compensated, for example by a slight elongation of the magnets. But more advantageously, the comparison of the standard version and version 2 shows that the invention makes it possible, again at constant dimensions, to gain 12% magnet volume while improving the performance of the motor as a result of a reduced air gap thickness.

What is claimed is:

1. An inductor for an electric rotary machine comprising a hollow or solid cylindrical yoke having a side wall to which is attached at least one sintered magnet having a pole face disposed facing an armature, the at least one sintered magnet being attached to the yoke by an over-molding which coats at least said pole face with a composite over-molding material comprising a ferromagnetic material dispersed in a solid non-magnetic binder.

2. An inductor according to claim 1, wherein the cylindrical yoke is hollow and the at least one sintered magnet is attached to an inner side wall of the yoke, with the armature being disposed inside the inductor.

3. An inductor according to claim 1, wherein the cylindrical yoke is solid or hollow and the at least one sintered magnet is attached to an outer side wall of the yoke, the armature thus surrounding the inductor.

4. An inductor according to claim 1, wherein an air gap is defined between the over-molding material and the armature.

5. An inductor according to claim 4, wherein the air gap has a thickness always less than 0.7 mm.

6. An inductor according to claim 5, wherein the air gap has a thickness always less than 0.3 mm.

7. An inductor according to claim 1, wherein the over-molding material covering the pole face has a thickness between 0.5 and 5 mm.

8. An inductor according to claim 1, wherein the over-molding material and the at least one magnet form a rigid assembly inserted into the yoke or obtained by the injection, extrusion, compaction or molding of said material into the yoke.

9. An inductor according to claim 1, wherein leaks of magnetic flux along lateral surfaces of the at least one magnet are minimized.

10. An inductor according to claim 9, wherein the over-molding material along the lateral surfaces has a thickness of less than 5 mm.

11. An inductor according to claim 1, wherein the at least one magnet is a permanent magnet based on ferrites or on rare earths.

12. An inductor according to claim 1, wherein the over-molding material has a magnetic permeability greater than 2.

13. An inductor according to claim 12, wherein the over-molding material has a magnetic permeability between 4 and 40.

14. An inductor according to claim 1, wherein the ferromagnetic material dispersed in the non-magnetic binder is a soft ferromagnetic metal containing at least one element selected from the group consisting of Fe, Co and Ni.

15. An inductor according to claim 1, wherein the solid magnetic binder is based on thermosetting or thermoplastic resin.

* * * * *